United States Patent [19]
Sheu et al.

[11] Patent Number: 5,193,884
[45] Date of Patent: Mar. 16, 1993

[54] DIRECT WHEEL TRIM ATTACHMENT SYSTEM

[76] Inventors: Long C. Sheu, No. 39 Sha Lun, Chung Sha Tsun, An Ding Shiang, Tainan Hsien, Taiwan; James P. Wright, 1060 Robin La., Cookeville, Tenn. 38501

[21] Appl. No.: 736,734

[22] Filed: Jul. 26, 1991

[51] Int. Cl.5 .............................................. B60B 7/06
[52] U.S. Cl. ................................ 301/37.37; 301/37.1; 301/108.4
[58] Field of Search ............... 301/37 R, 37 S, 108 R, 301/108 S

[56] References Cited

U.S. PATENT DOCUMENTS

| Re. 33,806 | 1/1992 | Wang et al. | 301/37 S |
|---|---|---|---|
| 3,092,420 | 6/1963 | Baldwin et al. | 301/37 |
| 3,918,764 | 11/1975 | Lamme | 301/37 |
| 4,447,091 | 5/1984 | Nguygen et al. | 301/37 |
| 4,842,339 | 6/1989 | Roulinson | 301/37 S |
| 4,895,415 | 1/1990 | Stay et al. | 301/37 S |
| 4,932,724 | 6/1990 | Wright | 301/37 |
| 5,031,965 | 7/1991 | Buerger | 301/37 S |
| 5,048,898 | 9/1991 | Russell | 301/37 S |

FOREIGN PATENT DOCUMENTS

| 1160262 | 1/1984 | Canada. | |
|---|---|---|---|
| 633632 | 2/1928 | France | 301/108 S |
| 1172809 | 12/1969 | United Kingdom. | |
| 2046185 | 11/1980 | United Kingdom. | |

OTHER PUBLICATIONS

Jul. 30, 1991, Ford Motor Company, "Qualified Vehicle Modifier Bulletin".

Primary Examiner—Russell D. Stormer
Attorney, Agent, or Firm—Edward D. Lanquist, Jr.; Mark J. Patterson

[57] ABSTRACT

The present invention relates to a wheel trim member that maintains a very low profile substantially against a front or rear wheel, depending upon its application. The trim member has at least one, and preferably at least two, discs for receipt of wheel studs. This disc has external threads which are received by a disc cover which holds trim member against wheel. Lug nut covers are then placed over the remaining unencapsulated lug nuts to achieve consistent aesthetic appearance.

5 Claims, 8 Drawing Sheets

DIRECT WHEEL TRIM ATTACHMENT SYSTEM

BACKGROUND OF THE INVENTION

The present invention relates generally to a mechanism for attaching a decorative wheel trim member directly to a motor vehicle wheel and more particularly to a wheel trim attachment system that uses lug nut and encapsulators to attach a decorative wheel trim member to either the front or rear wheel without removal of the existing lug nuts.

It is the desire of many owners of trucks and recreational vehicles to improve the cosmetic appearance of their wheels by adding decorative trim rings and the like which perform a function similar to a standard hubcap available on automobiles. Indeed, the prior art contains many examples of methods and brackets that have been developed to accomplish this. Some employ spring clips or hooks which engage under tension the outer portion of the wheel. Others use brackets which mount directly to the wheel lugs and, in turn, provide a central point for attachment of the wheel trim member.

For example, U.S. Pat. No. 3,918,764 issued to Lamme discloses a combined lock bracket and wheel cover for automotive vehicles. However, Lamme uses bracket 26 which must be attached underneath the existing lug nut of a wheel. Many manufacturers have discovered that it is unsafe to remove a lug nut to place a wheel trim attachment member on the wheel. Further, the Department of Transportation requires that all decorative trim members must be removed for a DOT inspection of the wheel without removal of the existing lug nuts. Because the device of Lamme is attached to the wheel using a bracket, Lamme cannot perform this function. Furthermore, Lamme does not recognize and does not teach the use of attachment at a locator pin.

Canadian Patent No. 1,160,262 issued to Ladouceur discloses a wheel cover. Although Ladouceur discloses the use of a trim member that is not fastened by removal of lug nuts, Ladouceur fails to recognize the benefits of lowering the plane formed by the trim member as it resides against the wheel. Vehicle owners desire that a wheel trim attach member must be placed close to the existing wheel to achieve a low profile.

What is needed, then, is a direct wheel trim attachment system that can be installed on either the front or rear wheel. Additionally, the wheel trim member must be attachable and removable without the removal of the existing wheel lug nuts. This wheel trim attach member must be able to attach to an existing wheel stud even when few threads are exposed by the conventional wheel lug nut. The wheel trim attach member must be such that it can cover the existing wheel lug nuts in an aesthetic manner while still enabling direct attachment using jam nuts. This attachment is presently lacking in the prior art.

SUMMARY OF THE INVENTION

In the present device, a single wheel trim attachment system is provided for attachment directly to a front or rear wheel. The trim member has holes aligned to fit over the desired front or rear wheel to be covered. This hole can either be round, hexagonal, or any other shape to fit over the existing lug nuts of a wheel. This hole can also be cut in a hex-shape such that finger are left to guide and frictional grasp the existing lug nut. In some of these holes are placed a decorative lug nut cover. A disc is place over the studs of the lug nuts not covered by the lug nut cover. A disc cover attaches to this disc. This disc cover can be one-piece or can be a shell and a cover. In one embodiment, the head or nub of the encapsulator has threads that receive the stud. In another embodiment, a disc having internal and external threads threadably attaches to the stud by the discs internal threads. The external threads then receive a lug nut encapsulator having internal threads.

Accordingly, one object of the present invention is to provide a decorative wheel trim member that can be attached to the wheel such that it achieves a very low profile.

Another object of the present invention is to provide a system that allows the attachment of a direct wheel trim member without the removal of any existing wheel lug nuts.

Another object of the present invention is to have the means of attaching the wheel trim member as part of the wheel.

Still another object of the present invention is to achieve a consistent aesthetic appearance.

Still a further object of the present invention is to provide a wheel trim attachment system that can be used even though there are very few threads exposed above the existing wheel stud.

DESCRIPTION OF THE PREFERRED EMBODIMENT

Figure 1:
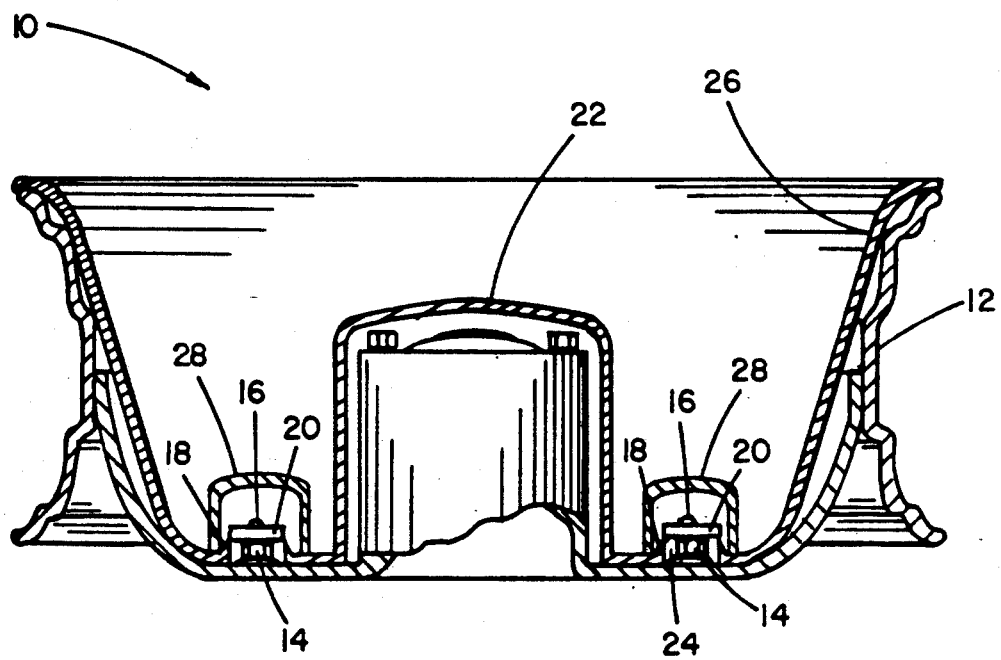
FIG. 1 is a side cutaway view of a direct wheel trim attachment system for attaching to a rear wheel.

Referring now to FIG. 1, there is shown generally at 10 the direct wheel trim attachment system of the present invention. Trim 26 is formed as to closely resemble the contours of rear wheel 12. Trim member 26 rises at hub cover 22 to cover the hub of wheel 12. Trim member 26 fits over existing lug nuts 14 in one of two ways. At least one of lug nuts 14 is placed through hole 24 in trim member 26. This hole can be of any shape, as long as it fits over lug nut 14. Hole 24 can also be made by punching an asterisk-shaped hole in trim member 26. The asterisk shape leaves fingers 18 such that they will extend outwardly away from the wheel at substantially a ninety degree angle from the mounting plane. Fingers 18 frictionally fit to lug nut 14. In the preferred embodiment, twelve fingers 18 are produced by piercing trim member 26 although any number of fingers can be used. Disk 20, having internal threads and external threads, screws over existing stud 16 corresponding to received nut 14. Disc 20 may or may not contact nut 14. Disk cover 28 having internal threads screws over external threads of disk 20. Disk cover 28 holds trim member 26 in place. Disc cover 28 has bevel (60 in FIG. 5) which traps fingers 16 against nut 14. Bevel (60 in FIG. 5) prevents fingers 16 from interfering with internal threads of disc 20. In the preferred embodiment, disk 20 and disk cover 28 are placed over two lug nuts 14. The remaining nuts 14 are idle and covered by decorative lug nut cover 30 in FIG. 4 which can be integrated into trim member 26 or can releasably or fixedly attach to trim member 26.

Figure 2:
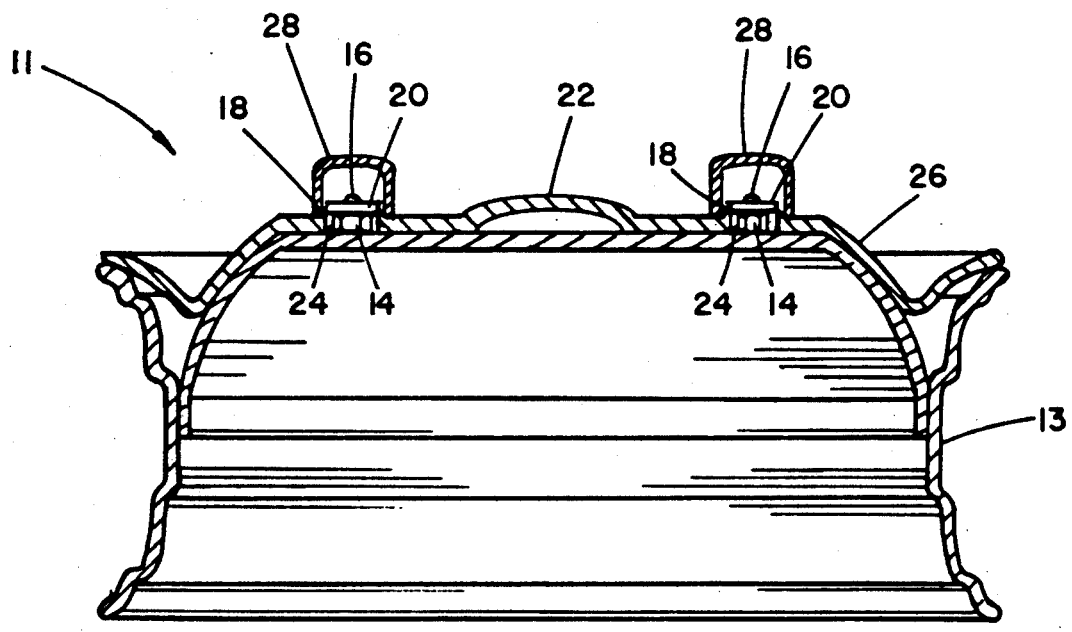
FIG. 2 is a side cutaway view of a direct wheel trim attachment system for attachment to a front wheel.

Referring now to FIG. 2, there is shown generally at 11 wheel trim member 26 as it attaches to front wheel 13. Once again, trim member 26 follows the general contours of wheel 13. At least one lug nut 14 is received by hole 24 in trim member 26. Disk 20 is placed over at least one lug nut 14 that is covered by hole 24. Disk 20 has internal threads that attach to stud 16. Disk 20 has external threads. Disk cover 28, having internal threads, screws over disk 20 at external threads. Trim member 26 can also have hub cover 20 that is not as exaggerated as the one in FIG. 1.

Figure 3:
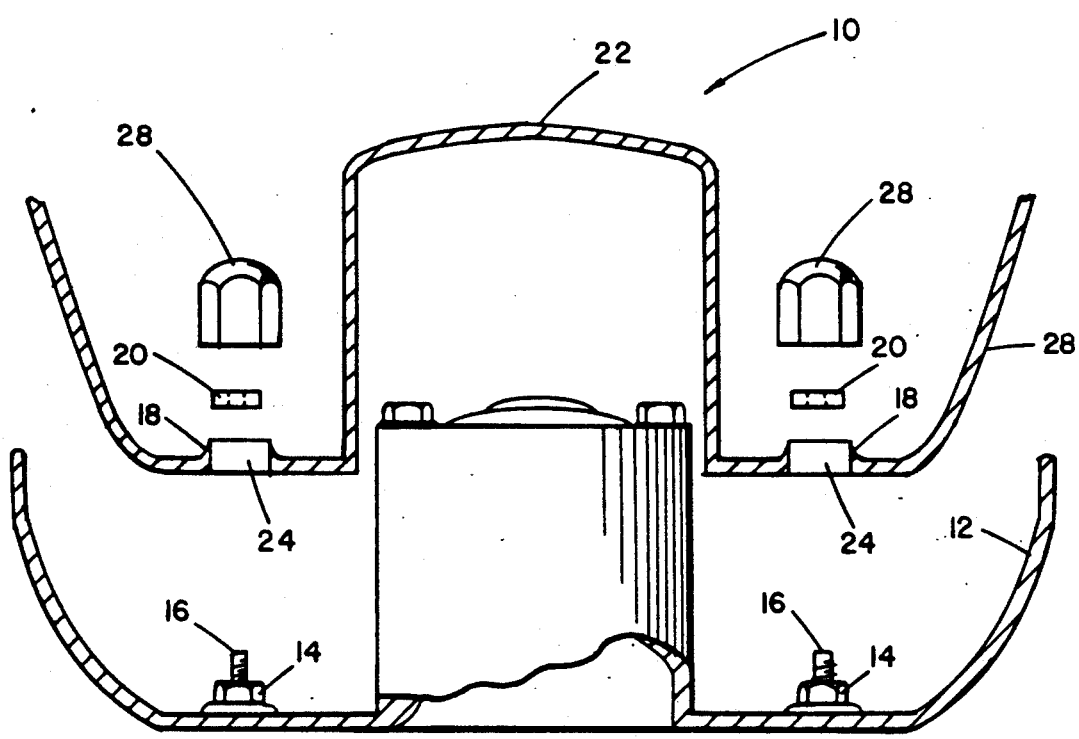
FIG. 3 is a side exploded cutaway view of the direct wheel trim attachment system as it attaches to a rear wheel.
Figure 6:
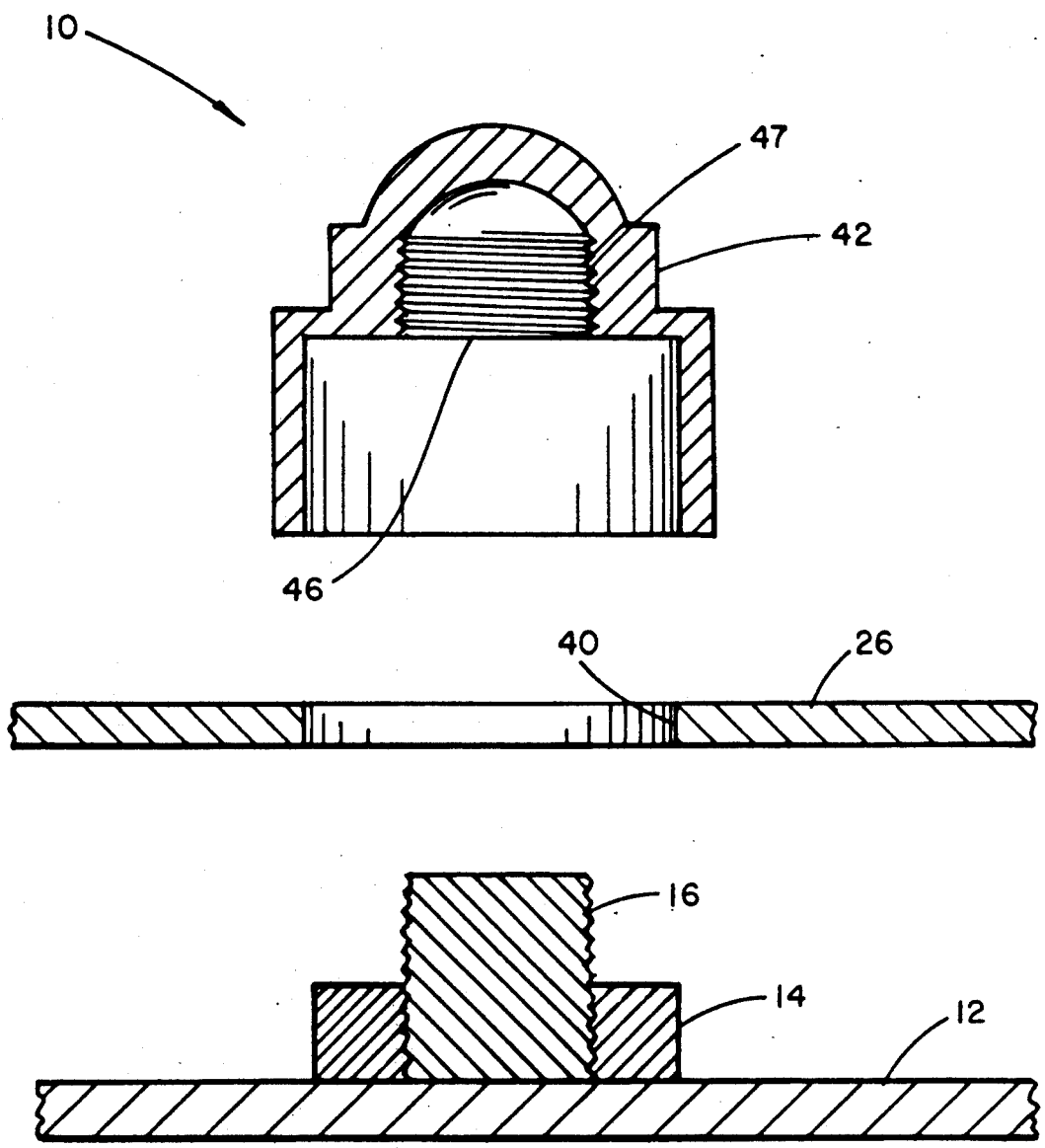
FIG. 6 is an exploded cutaway view of another embodiment of the wheel lug nut encapsulator of the present invention.

Referring now to FIG. 3, there is shown generally at 10 the direct wheel trim attachment system of the present invention in an exploded view. Hole 24 of trim member 26 is placed over lug nut 14. Fingers 18 can frictionally hold lug nut 14 in place. Disk 20 is screwed on to stud 16. Disk cover 28 has internal threads which screw on to external threads of disk 20. Those studs 16 which are not received by disk 20 are covered not by disk cover 28 but by lug nut cover 30 as shown in FIG. 6. As previously stated, fingers 18 are placed in the preferred embodiment by using an asterisk stamp. However, fingers 18 are not essential. Fingers 18 do provide a centering mechanism.

Figure 4:
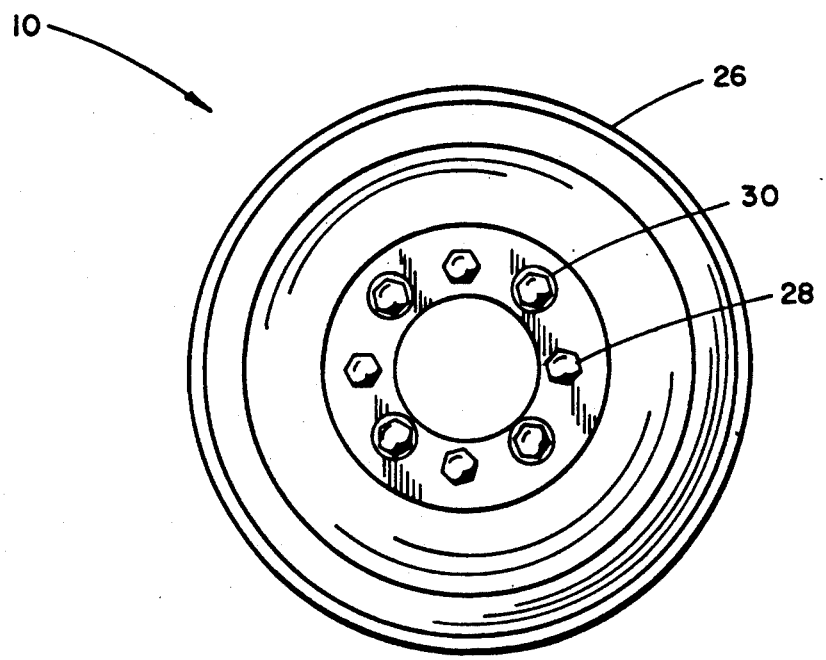
FIG. 4 is a plan view of the direct wheel trim attachment system.

Referring now to FIG. 4, there is shown generally at 10 the direct wheel trim attachment system of the present invention. As is shown in FIG. 4, some lug nuts 14 are covered by lug nut cover 30, while others are covered by disk cover 28. As previously stated, in the preferred embodiment, at least two lug nuts 14 are covered. However, attachment can be achieved by merely covering one lug nut 14.

Figure 5:
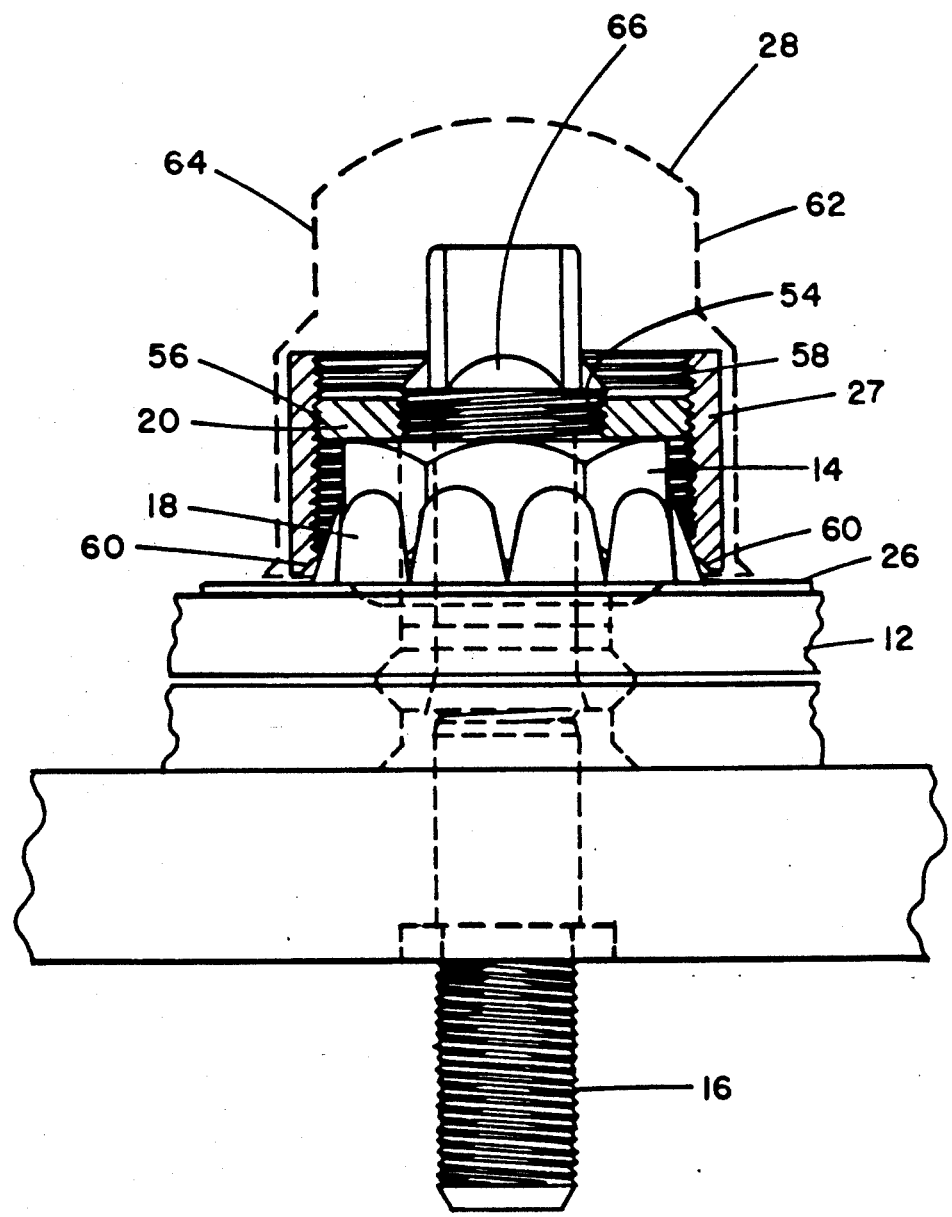
FIG. 5 is a side cutaway view of the disk cover of the present invention.

Referring now to FIG. 5, there is shown disk 20 and disk cover 28 at work. In this particular embodiment, disk 20 is screwed over stud 16 until it contacts lug nut 14. Disk 20 has internal threads 54 which receive stud 16. In this particular embodiment, sleeve 27, having internal threads 58, threadably attaches to external threads 56 of disk 20. Sleeve 27 has beveling 60 toward lower portions so that threads 58 of sleeve 27 do not interfere with fingers 18. In this particular embodiment, disk cover 28 is actually formed by placing shell 62 frictionally over sleeve 27. In contrast, disk cover 28 can be one piece. Sleeve 27 then holds trim member 26 in place against wheel 12. Shell 62 or disk cover 28 can have hexagonal head 64 so that disk cover 28 can be securely fastened against trim member 26. Disk 20 will have some type of hole to receive some screwing device or have a square knob 66 so that it can be screwed down onto lug nut 14. Shell 62 allows different types of decorative lug nuts to be placed over disk 20.

Referring now to FIG. 6, there is shown generally at 6 still another embodiment of the direct wheel trim attachment system of the present invention. In this instance, hole 40 of trim member 26 fits over lug nut 14. Lug nut encapsulator 42 has internal threads 47 in cap area 46. Threads 47 receive stud 16. Through threads 47 attached to stud 16, lug nut encapsulator 14 holds trim member 26 against Wheel 12.

Figure 7:
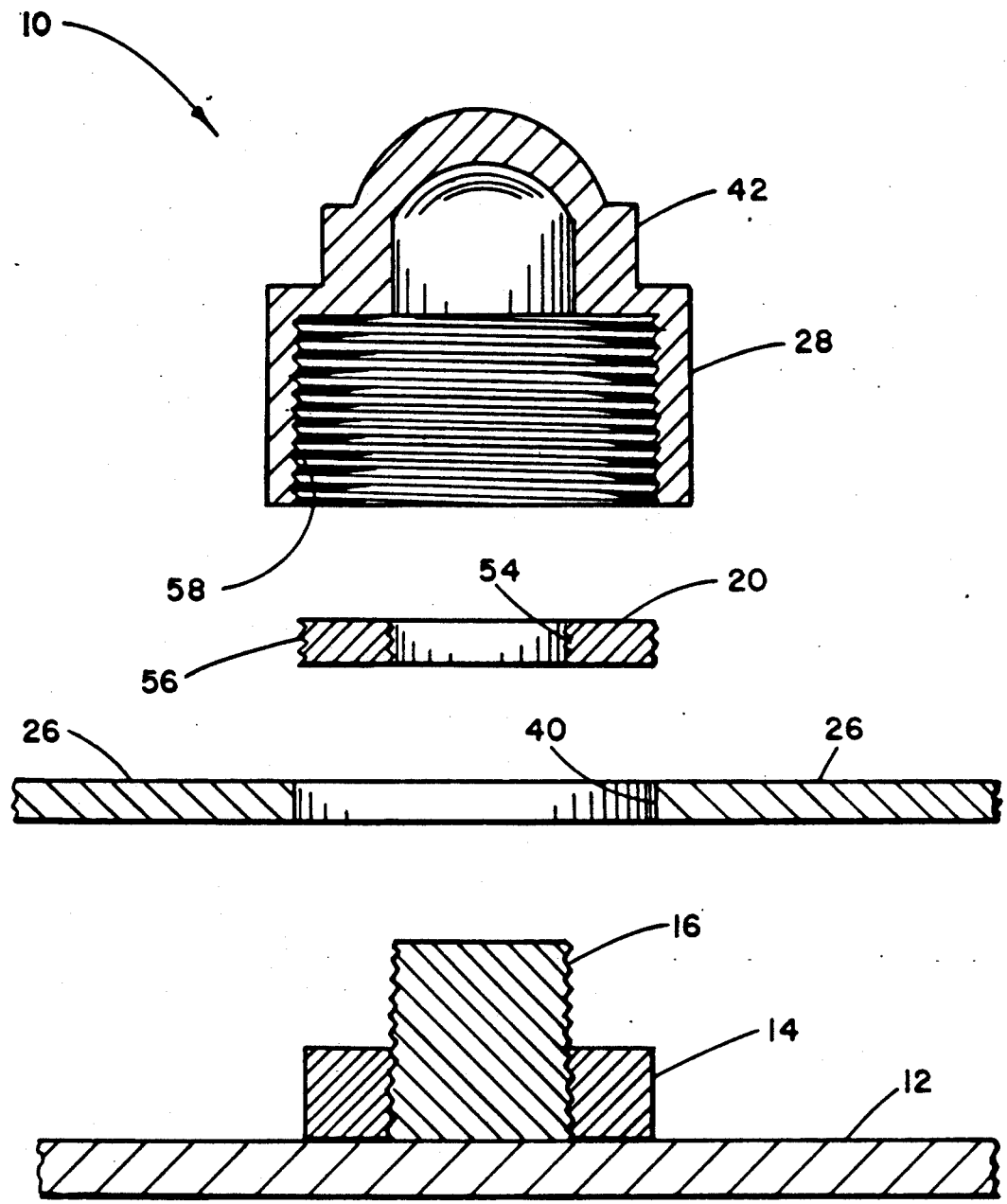
FIG. 7 is an exploded cutaway view of another embodiment of the wheel lug nut encapsulator of the present invention.

Referring now to FIG. 7, there is shown generally at 10 still another embodiment of the present invention. In this particular embodiment, disk 20 having internal threads 54 and external threads 56. Internal threads 54 attach to stud 56. Disk 20 may or may not contact lug nut 14. External threads 56 of disk 20 are received by internal threads 58 of disk cover 28.

In the preferred embodiment, opposite studs 16 are used to provide better attachment of trim member 26 to wheel 12 or 13. In certain instances, a single point of attachment is sufficient. However, in the preferred embodiment, at least two points of attachment are recommended.

The present system 10 can be used with any type of front or rear wheel, whether it is singly mounted or doubly mounted.

Figure 8:
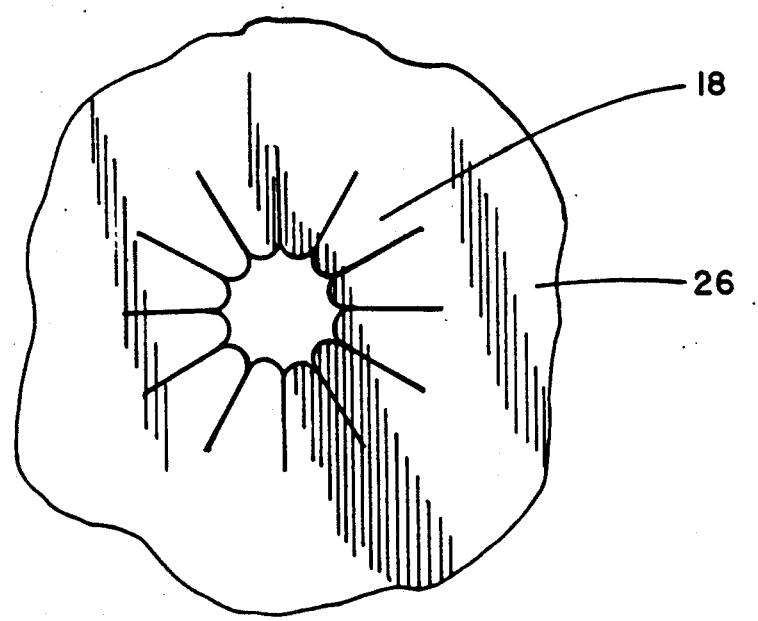
FIG. 8 is a plan view of the stamp used in the preferred embodiment.

FIG. 8 is a plan view of the stamp to produce fingers 18 in the present invention. Operation of fingers 18 can be seen in FIGS. 5, 9, and 11.

Figure 9:
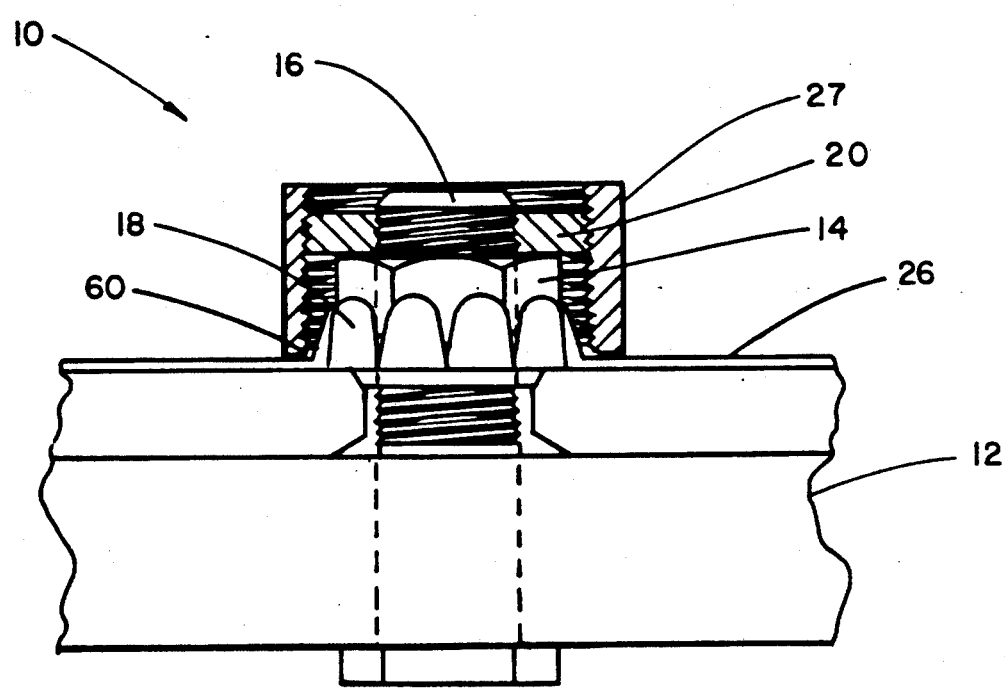
FIG. 9 is a side cutaway view of one embodiment of the direct wheel trim attachment system before the disk cover is placed over the sleeve.

Referring now to FIG. 9, there is shown generally at 10 an embodiment of the direct wheel trim attachment system prior to the placement of disk cover 28. In this instance, trim member 26 is placed over lug nut 14 such that fingers 18 frictionally contact lug nut 14. Disk 20 is then placed over stud 16 until disk 20 contacts lug nut 14. Sleeve 27 is then screwed over external threads of disk 20 until sleeve 27 contacts trim member 26. Beveling 60 is provided to hold fingers 18 against lug nut 14 without damaging fingers 18 and threads of sleeve 27. Disk 20 can have holes placed in it to receive some type of tool to turn disk 20 about stud 16.

Figure 10:
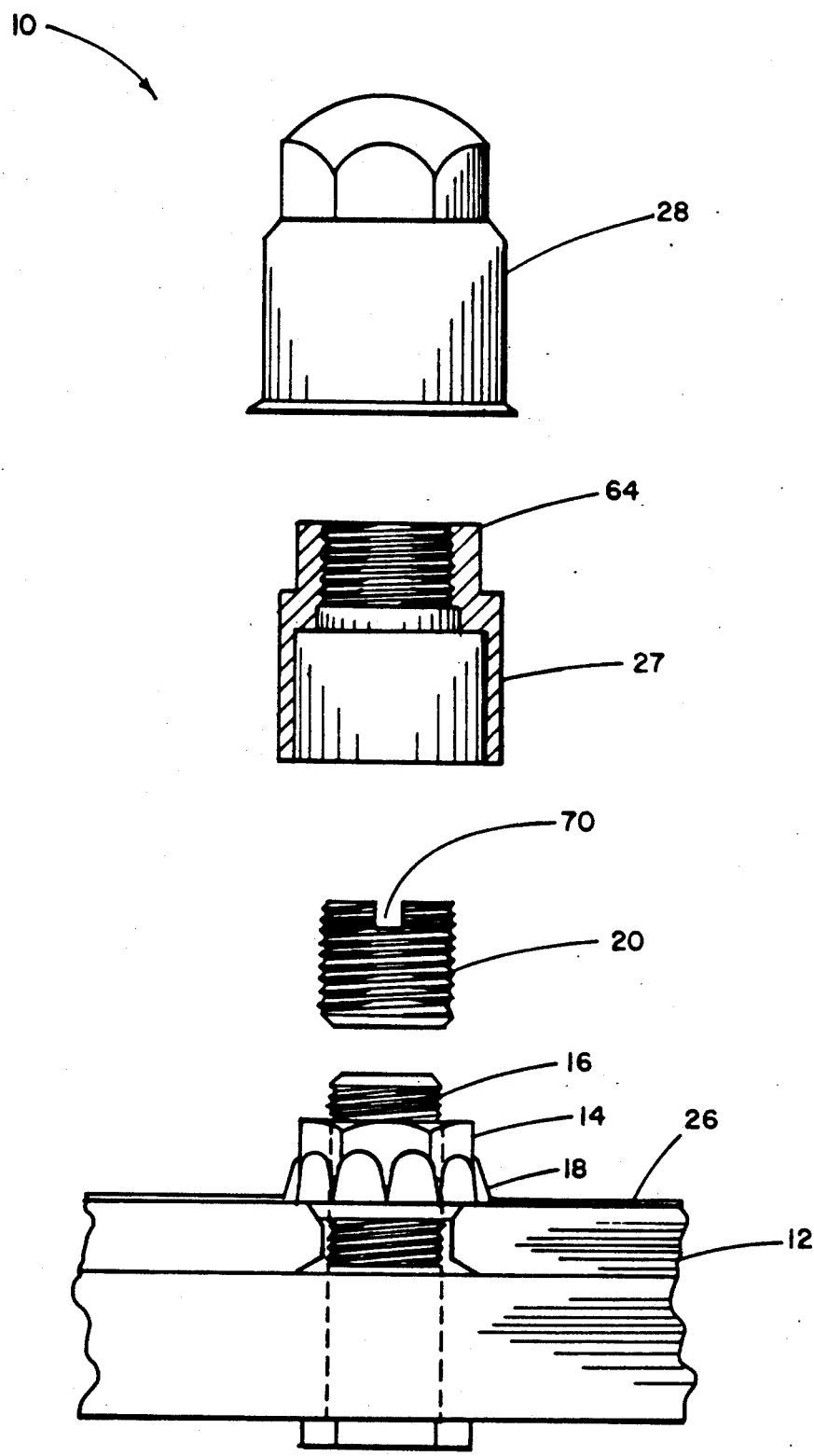
FIG. 10 is an exploded view of still another embodiment of the present invention.
Figure 11:
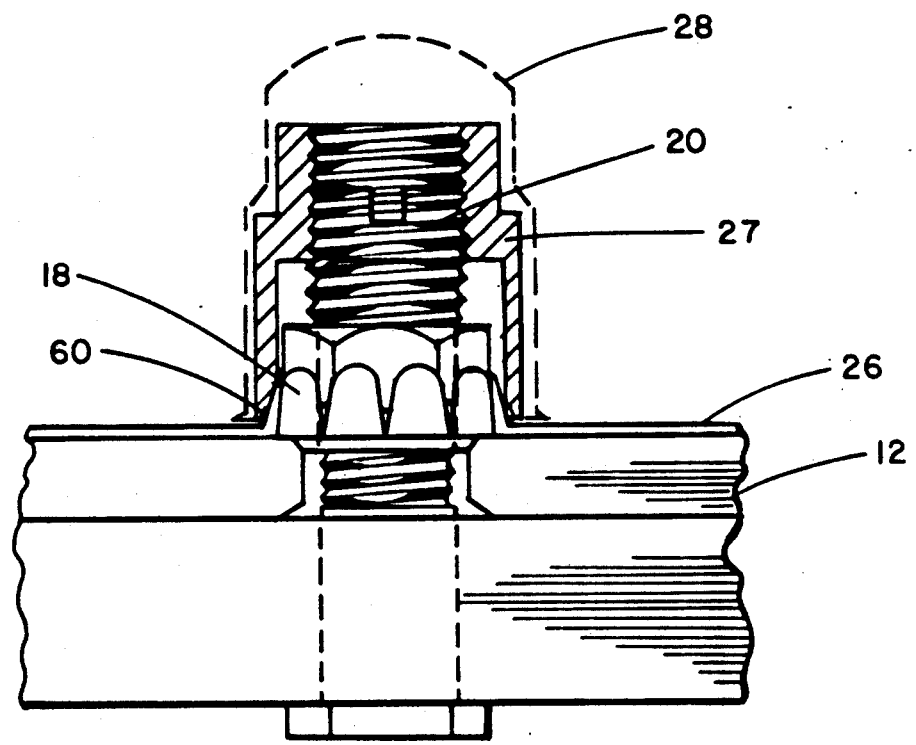
FIG. 11 is a cutaway view of the embodiment of the disk cover of the present invention shown in FIG. 10.

Referring now to FIGS. 10 and 11, there is shown generally at 10 still another embodiment of the direct wheel trim attachment system of the present invention. In this instance, trim member 26 is placed over lug nut 14 until it contacts wheel 12. Substantially elongated disk 20 having internal and external threads is then screwed over stud 16 until disk 20 contacts lug nut 14. Sleeve 28 is then placed over lug nut 14. Threads 68 of sleeve 27 receive disk 20. Sleeve 27 has hex head 64 so that a tool can be placed over sleeve 27 to tighten about disk 20. After sleeve 27 is tightened against trim member 26, disk cover 28 in FIG. 2 is then applied frictionally over sleeve 27.

Fingers 18 of the present invention frictionally contact lug nut 14. Bevel 60 of sleeve 27 Or disk cover 28 trap fingers 18 against lug nut 14 so that any individual finger 18 can hold sleeve 27 or disk cover 28 frictionally in place.

As can be seen in FIG. 10, disk 20 can have notch 70 which receives tool for tightening.

In certain embodiments, a hex head can be attached to disk 20 by welding, glue, or any other type of fixed attachment, to provide a place over which a tool can be placed for tightening.

Thus, although there have been described particular embodiments of the present invention of a new and useful direct wheel trim attachment system, it is not intended that such references be construed as limitations upon the scope of this invention, except as set forth in the following claims.

what I claim is:

1. A decorative trim member attachment system for direct attachment to a wheel having a lug nut and a wheel stud received by said lug nut, said trim member comprising:
   a. a trim member having a hole for receiving said lug nut and said stud;
   b. a disc having internal threads and external threads, said disc releasably attached to said stud by said internal threads; and
   d. a disc cover having inner threads, said disc cover releasably attached to said disc by engagement of said inner threads by said external threads; and
   e. said disc cover releasably attaching said trim member to said wheel proximate to said receiving hole.

2. The device of claim 1 wherein said hole comprises fingers punched into said trim member such that said fingers are engaged by said inner threads of said disc cover.

3. A decorative trim member attachment system for direct attachment to a wheel having a first wheel stud received by a first lug nut and a second wheel stud received by a second lug nut, said trim member comprising:
   a. a trim member having a hole for receiving said first lug nut and said first stud;
   b. a disc having internal threads and external threads, said internal threads releasibly engage said first stud;
   c. a lug nut encapsulator having inner threads, said inner threads of said lug nut encapsulator attached to said external threads of said disc; and
   d. said lug nut encapsulator releasably attaching said trim member to said wheel.

4. The system of claim 3 further comprising a lug nut cover attached to said trim member for enveloping said second lug nut.

5. A direct wheel trim attachment system for a wheel having a wheel stud received by a lug nut, said trim member comprising:
   a. a trim member having a hole for receiving said lug nut, said trim member placed in substantial contact with said wheel, said hole having fingers extending away from said wheel when said trim member is placed on said wheel;
   b. a lug nut encapsulator having inner threads for engaging said stud; and
   c. said inner threads engage said fingers of said trim member.

* * * * *